(12) United States Patent
Skoczkowski et al.

(10) Patent No.: US 7,801,171 B2
(45) Date of Patent: Sep. 21, 2010

(54) METHOD FOR IMPLEMENTING AN OPEN CHARGING (OC) MIDDLEWARE PLATFORM AND GATEWAY SYSTEM

(75) Inventors: Lucas Skoczkowski, Oakville (CA); Rubens Rahim, Markham (CA)

(73) Assignee: Redknee Inc., Mississauga, Ontario ( * ) Notice: Subject to any disclaimer, the term of this patent is extended or adjusted under 35 U.S.C. 154(b) by 1781 days.

(21) Appl. No.: 10/307,335

(22) Filed: Dec. 2, 2002

(65) Prior Publication Data
US 2004/0105424 A1 Jun. 3, 2004

(51) Int. Cl.
*H04J 3/16* (2006.01)
(52) U.S. Cl. .................... 370/466; 370/352; 370/401; 370/465; 370/467; 455/405; 455/406; 455/407; 455/408; 455/424; 709/227; 709/228; 709/229; 707/3; 707/10; 707/102; 707/104
(58) Field of Classification Search ......... 455/405–409, 455/424; 719/311, 314, 328; 379/100.03, 379/100.04, 114.01, 114.05, 114.06, 114.07, 379/114.08, 114.09, 114.1, 114.15, 114.16, 379/114.17, 114.2, 114.29, 115.02, 121.02, 379/121.03, 131, 15.02, 15.03, 15.04, 88.17, 379/88.13; 707/3, 10, 102, 104; 370/465, 370/401, 352, 467, 522, 466; 709/213, 214, 709/218, 230, 250, 223, 225, 226, 227, 228, 709/229, 246
See application file for complete search history.

(56) References Cited

U.S. PATENT DOCUMENTS

| 5,963,630 | A | * | 10/1999 | Dabbs et al. | 379/201.01 |
| 6,226,373 | B1 | * | 5/2001 | Zhu et al. | 379/207.02 |
| 6,785,534 | B2 | * | 8/2004 | Ung | 455/406 |
| 6,847,708 | B1 | * | 1/2005 | Abbasi et al. | 379/114.2 |
| 6,895,235 | B2 | * | 5/2005 | Padgett et al. | 455/406 |
| 7,139,387 | B2 | * | 11/2006 | Dahari | 379/229 |
| 7,272,133 | B2 | * | 9/2007 | Valin et al. | 370/352 |
| 7,496,111 | B2 | * | 2/2009 | Itzkovitz et al. | 370/467 |
| 2003/0134614 | A1 | * | 7/2003 | Dye | 455/406 |
| 2004/0002329 | A1 | * | 1/2004 | Bhatia et al. | 455/422.1 |

* cited by examiner

*Primary Examiner*—Charles N Appiah
*Assistant Examiner*—Olumide T Ajibade Akonai
(74) *Attorney, Agent, or Firm*—T. Andrew Currier; Stephen J. Perry; Perry + Currier Inc.

(57) ABSTRACT

The art of present discloses a method and system for enabling mobile network operators to collect charging information from various other network elements; and indeed, is intended to exploit the resiliency of open network architecture and lessen the requisite dependency on proprietary network elements services and billing systems. The Open Charging (OC) middleware platform and gateway system interacts with proprietary network elements and effectually creates a unifying, enabling layer in mobile networks. Indeed, the art is directed at permitting mobile subscriber access to, among others, third party content and services with the simplicity and convenience of such charges appearing on either mobile phone bill, or decremented from said mobile subscriber's pre-paid account.

13 Claims, 4 Drawing Sheets

METHOD FOR IMPLEMENTING AN OPEN CHARGING (OC) MIDDLEWARE PLATFORM AND GATEWAY SYSTEM

BACKGROUND ART

Formerly, wireless and/or mobile subscribers faced the irksome option of multiple billing for whichever content and/or service(s) they wished to utilize. Needless to say, the arrangement remained most inconvenient. With the growth and sophistication of modern telecommunications networks, and in particular, the subsequent evolution of open service architecture(s) (OSA) we have seen the decoupling of application and network layers together with an augmentation of multi-party applications and related infrastructure.

The Open Charging (OC) middleware platform and gateway system disclosed herein presages a new era of mobile subscriber access (and ease of access) to content and/or service(s) by allowing such content to be charged to subscribers existing account(s) with their mobile provider.

Indeed, none of the prior art reviewed teach or intimate the subject matter hereof seeking the protection of Letters Patent. Consider U.S. Pat. No. 5,963,630 to Dabbs et al., entitled Mediation service control point within an intelligent network, which teaches of a mechanism whereby a mediation SCP provides for a SCCP based mediation and redirection function whereof messages originated by SSPs are directed to the appropriate SCP(s) on the basis of subscriber identifiers which are encapsulated within the aforementioned messages produced by SSPs. However, Dabbs et al., does not teach or suggest a method of providing a mediation capability whereby a plurality of network elements (other than SCPs) can be accessed in an efficient manner via a variety of interfaces and protocols as the case may be. Furthermore, the patent to Dabbs et al. does not teach or suggest a method whereby a mechanism of accessing subscriber attributes (e.g. account balance information) stored on network elements (e.g. SCPs) can be extended to other computational platforms which may reside outside of the telecommunications carrier via an object oriented Application Programming Interface (API).

Consider similarly, U.S. Pat. No. 5,812,533 to Cox et al., entitled Service provision in communications networks, which details a service delivery infrastructure whereby a Service Control Point is augmented for the purpose of provisioning selected sets of services to users of the communications network by interacting with network systems via an object oriented architecture. However, it does not teach or suggest a method of reducing the number of transactions and therefore increasing the efficiency of non-augmented Service Control Points. Furthermore, the patent to Cox et al. does not teach or suggest a method of mediating and directing object-oriented requests to network elements other than Service Control Points.

U.S. patent application Ser. No. 2002/0,058,496 by Bos et al., entitled Charging arrangement for a multimedia communication system, provides for a mechanism whereby charging information, related to multimedia service provided to a user, is directed to a Service Control Point via the CAMEL Application Part (CAP) bearer network interface for the purpose of facilitating the charging process for the aforementioned service. However, Bos et al.'s application does not teach or suggest a method of providing a mediation capability whereby a plurality of network elements (other than SCPs) can be accessed in an efficient manner via a variety of interfaces and protocols (other than CAP) as the case may be. Furthermore, their application does not teach or suggest a method whereby a mechanism of accessing subscriber attributes (e.g. account balance information) stored on network elements (e.g. SCPs) can be extended to other computational platforms which may reside outside of the telecommunications carrier via an object oriented Application Programming Interface (API).

In relation to the subscriber information caching mechanisms detailed herein, among other unique aspects of the invention of present, consider U.S. Pat. No. 6,473,402 to Moharram, entitled Communications link interconnecting service control points of a load sharing group for traffic management control, provides for a mechanism whereby a given a given transaction can be directed to a plurality of SCPs in order to share the transactional load among the SCPs. However, Moharram's patent does not teach or intimate a method of aggregating transactions for the purpose of reducing the collective number of transactions which have to be processed by a single SCP or plurality of SCPs. Furthermore, it does not teach or intimate a method of reducing the transactional capacity for network elements other than SCPs.

U.S. patent application Pub. Ser. No. 2002/0,156,863 by Peng, entitled Apparatus and methods for managing caches on a gateway, details art relevant to the caching of data particular to Internet gateways and the prior art deficiencies of wireless internet users who may have inadequate processing capability for retrieving information, and similarly, very limited memory space for caching such information. Nonetheless, nothing therein details or intimates art designed to lessen the impact on IN elements, by specifically and uniquely gathering, collating and analyzing machine readable records (as wireless subscriber balances and so on); thereby enabling a single update to such platforms, as opposed to a multitude thereof.

REFERENCES CITED

U.S. patent application Ser. No. 20,020,156,863 October 2002 Peng 709/217
U.S. patent application Ser. No. 20,020,058,495 May 2002 Bos et al. 455/406
U.S. Pat. No. 6,473,402 October 2002 Moharram 370/236
U.S. Pat. No. 5,963,630 October 1999 Dabbs et al. 379/201.01
U.S. Pat. No. 5,812,533 September 1998 Cox et al. 370/259

TECHNICAL FIELD

The present invention relates generally to wireless communications and gateway services; and more specifically, to an improved method and system for effectuating and implementing an Open Charging (OC) middleware platform and gateway system.

SUMMARY OF THE INVENTION

In keeping with the evolution of open services and architecture, the present method and system is disclosed which provides real-time routing, profiling and charging of transactable requests. The art of present provides a distributed, secure, robust, and transactional interface to the fabric of existing mobile Service Control Point (SCP) platforms, among other IN (Intelligent Network) elements.

The Open Charging (OC) middleware platform and gateway system provides a distributed framework architecture through its implementation of Common Object Request Broker Architecture (CORBA) and SOAP-XML, which allows service enablers to build enhanced applications and other such services which interact with the IN platforms of multiple vendors. In addition to Common Object Request Broker Architecture (CORBA) and Extensible Markup Language (XML), practitioners skilled in the art shall recognize that a variety of object oriented application programming interfaces will satisfy the implementation of said architecture without affecting the intent and scope of the present invention.

Additionally, the platform and system of present can intermediate and process the various protocols required to interact with said former platforms, including CS1 (INAP), Prepaid-CTP, UCP and CAMEL Phase 2, among others).

The art of the Open Charging (OC) middleware platform and gateway system has been so crafted as to remain fully MVNO (Mobile Virtual Network Operator) compliant, providing as before an abstracted, secure, robust, distributed, and transactional interface to distributed mobile network and enterprise elements including, among others but in particular, IN platforms and, in alternate embodiments, HLRs, while utilizing advanced queuing methods to minimize impact on mobile services. Such an architecture carries with it, the unique potential for third-party developers and/or carriers to develop high capacity services and applications which interact with the nodes within mobile networks.

An aspect of the specification provides an open architecture method and gateway system for implementing an Open Charging (OC) middleware platform.

The platform can provide a common charging interface to various prepaid, postpaid and/or hybrid systems in helping facilitate real-time event charging.

Charging information can be commonly understood as data necessary for network operators to properly bill subscribers based on their activities, behaviors and/or use.

The method can involve subscriber registration and provisioning elements.

The registration and provisioning can be explicit, by indicating unequivocally which platform a request for a particular subscriber remains to be routed; or it may be implicit, providing general criteria in an effort to determine which platform to route requests to.

The Open Charging (OC) middleware platform and gateway system can be configured to retrieve external application logins and/or external application function calls via any number of bespoke or standardly-defined interfaces.

Such application logins or function calls may request balance query, balance deduction, and/or balance increment for a particular subscriber as per the parameters of the external application.

Such requests are relayed to the Security Engine of the art to verify whether or not said external application is in fact permitted to make such requests or calls.

The permissions can be determined by whether said external application is permitted to request said function; and/or whether the application is permitted to access the Intelligent Network (IN) platform where said subscriber is hosted; and/or whether the application is permitted to access and/or to modify the subscriber data (as per MVNO (Mobile Virtual Network Operator) compliance).

Requests can be routed to the Queuing Module/Mechanism upon satisfying said Security Engine parameters.

The Queuing Module can employ standard queuing methodology and implementations as per the priority set by the application which is making said request.

Requests taken off the Queuing Module can be translated into the specific protocol of the IN platform.

Functionality can be provided for by the IN adaptor, which inevitably remains tied to the details of the aforementioned IN platform to be interfaced.

Another aspect of the specification provides a subscriber information caching mechanism for writing subscriber account information, among other informational or data variables, to a cache within the Open Charging (OC) middleware platform and gateway system, or similar platforms and systems, itself.

The mechanism can comprise a computer program including instructions for implementing said caching mechanisms on a computer readable memory medium.

The mechanism can be calculated to lessen the IN platform's network impact by sending a single update to it as such.

The mechanism can be configured to represent a sum total of all balance increments and balance deductions among other informational variables.

DETAILED DESCRIPTION OF THE PREFERRED EMBODIMENTS

Figure 1:
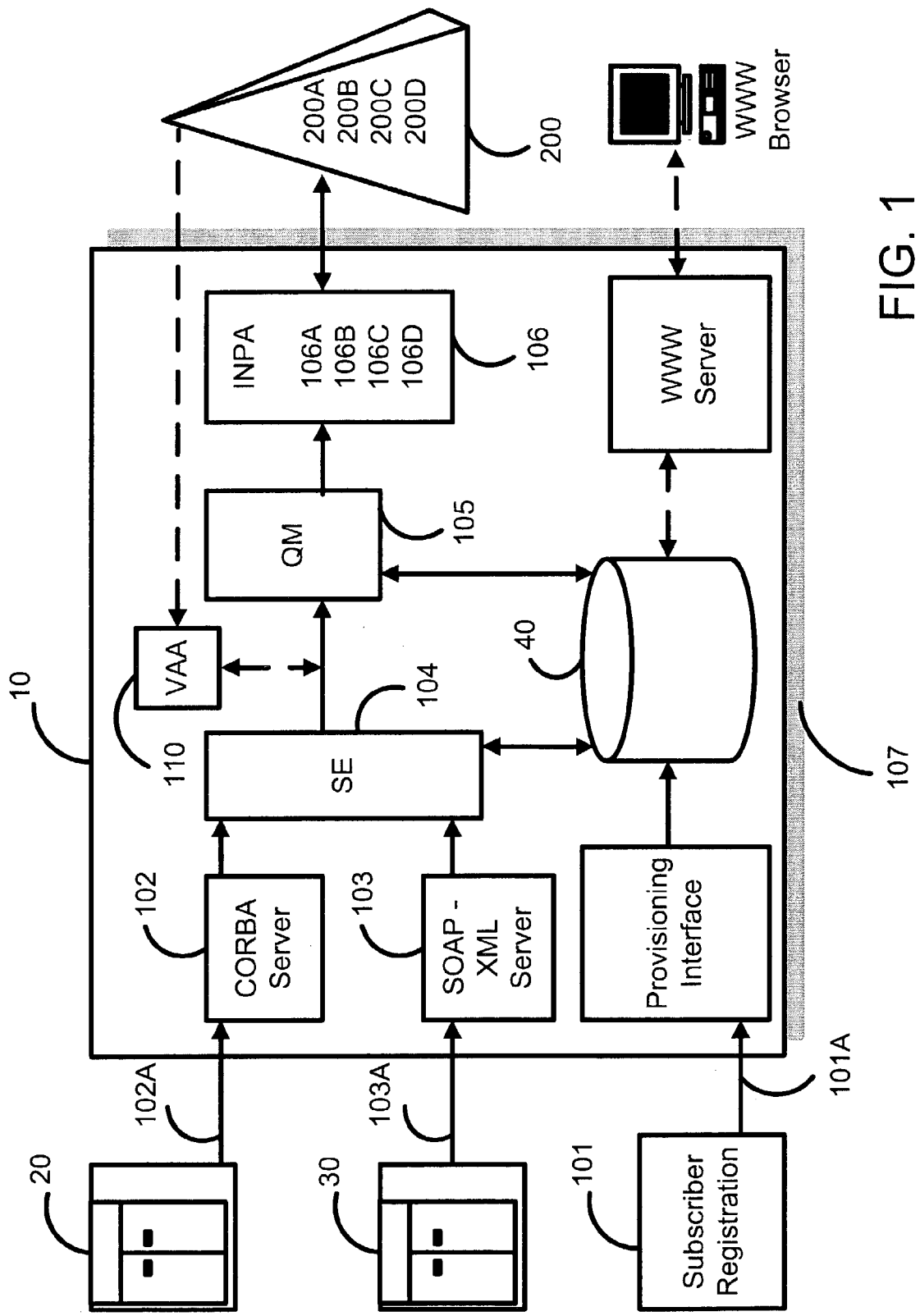
FIG. 1 illustrates a typical, non-limiting embodiment of the system level architecture employed in the disclosure of present.

With reference to FIG. 1, said architecture depicted consists of the following functional elements and/or modules:
  i. Subscriber Provisioning and/or Registration 101;
  ii. Application Interface 102A, 103A;
  iii. Security Engine (SE) 104;
  iv. Queuing Module (QM) 105;
  v. IN Platform/Protocol Adaptor (INPA) 106;
  vi. Application Activity Detection 107; and
  vii. Virtual Account Application (VAA) (Subscriber Information Caching Mechanisms) 110.

Subscriber Registration 101 is a feature of the platform and system 10 which allows said system 10 to determine which IN platform an application's request remains to be forwarded to, in systems where subscriber information is disseminated across multiple IN platforms.

Subscriber Provisioning 101A may be explicit, by indicating unequivocally which platform a request for a particular subscriber remains to be routed; or it may be implicit, providing general criteria in an effort to determine which platform to route requests to, as for example, in one embodiment, subscriber telephone number ranges.

The Open Charging (OC) middleware platform and gateway system 10 requires that applications register and login 40 before they are permitted to utilize said system. The platform and system 10 maintains application profiles of each application permitted as such. Said profiles indicate the functions of the system which a given application is permitted to use.

Still in reference to FIG. 1, the CORBA 102 and SOAP-XML 103 servers in tandem with their respective application interfaces 102A 103A (respectively), accept external application logins and external application function calls as per their usual function in a client-server system. Said CORBA 102 and SOAP-XML 103 servers accept, for instance, the balance query, balance deduction and balance increment function requests for a particular subscriber from an external application 20 30 (respectively) and relays said information to the Security Engine 104 to ensure that said application making the request has the requisite permission to so do. In addition to Common Object Request Broker Architecture (CORBA) and Extensible Markup Language (XML), which are delineated herein for the purposes of illustration, familiarity and simplicity, practitioners skilled in the art shall recognize that a variety of object oriented application programming interfaces will satisfy the implementation of said architecture without affecting the intent and scope of the present invention.

In varying embodiments, said permission(s) are determined by any number of factors, of which the follows remain merely illustrative:

a. whether the application is permitted to request said function;

b. whether the application is permitted to access the IN platform where said subscriber is hosted.

c. whether the application is permitted to access and/or to modify the subscriber data (as per Mobile Virtual Network Operator (MNVO) compliance).

Once said request has satisfied the Security Engine 104 verifications, the requests are then routed to the Queuing Module 105. Said Module 105 being responsible for routing the application request to the proper IN platform 200, based on the information entered during the Subscriber Provisioning phase 101A, and of queuing, throttling and prioritizing the requests (as stored on 40) to the IN platform(s) 200.

Each supported IN platform 200 is associated with a corresponding request queue. Each new request is added to the appropriate queue. Its place in said queue is determined by the priority of the application which has made the request. Requests are taken off the queue and passed to the IN platform 200 via the appropriate protocol adapter 106. The rate at which the requests are taken off the queue and passed is dependent on the throttling settings of each queue. The throttling of transactions is controlled on an IN element basis, and can be set to limit transactions to a certain number of transactions per second or per unit time. Once set, transactions will be dispatched to the IN element at a rate not exceeding the given limit. The platform and system 10 is able to control the impact to the IN network as well as the relative order of request processing in this manner.

Continuing with reference to FIG. 1, the Open Charging (OC) middleware platform and gateway system 10 has been so articulated as to support multiple IN platforms from a variety of equipment providers. Requests taken off the IN platform queue 105 are translated into the specific protocol of the IN platform 200A 200B 200C 200D by the IN specific adaptor 106A 106B 106C 106D (respectively) for that platform. In alternate embodiments, replies from the IN platform 200 may also handled by the adaptor 106. Said IN adaptor 106 is responsible for executing any login and authorization required by the IN platform 200 prior to sending requests thereof.

Although the IN specific adaptor 106 remains dependent upon the details of the vendor-provided IN platform 200, among the various embodiments and workings of the adaptor 106 the following four (4) non-limiting instantiations have been distilled merely for the purposes of illustration, and are indeed not intended to affect or dilute the intent and scope of the present invention, as practitioners skilled in the art shall recognize.

i. Non-real Time (Machine Readable Record Based).

The non-real-time, machine readable record based interface generates a written communications record in a IN platform specific format for each transaction request which has been passed to the IN adaptor 106A by the queuing module 105. The communications records are then collated and fed into the IN platform 200A on a non-real time basis to be processed.

ii. Real-time (TCP/IP Based).

A real-time TCP/IP based IN adaptor 106B interfaces with the IN platform 200B via a defined TCP/IP connection. The precise protocol employed is TCP/IP-based, and remains representative of a format compliant to the specifics of the interface as defined by the IN platform 200B manufacturer. Requests which are passed to the IN adaptor 106B by the queuing module 105 are translated into the IN platform specific protocol and transmitted to the IN platform 200B for processing.

iii. Generic Real-time (Generic Real-time Protocol Based).

A generic real-time based IN adaptor 106C interfaces with the IN platform 200C in the same manner as the real-time TCP/IP based adaptor 106B. However, the communication is done over that given generic real-time protocol rather than the TCP/IP protocol.

iv. Hybrid (Machine Readable Record Based and Real-time Based).

The Hybrid interface 106D utilizes a combination of machine readable record based and real-time based interfaces, as aforementioned. The specifics of which requests are to be processed by which method, remain dependent upon the specifications of the interfacing IN platform 200D.

In the preferred embodiment, the art is crafted as to permit the simultaneous interfacing of multiple IN platforms 200 each of which utilize a different IN adaptor 106. Each adaptor may be of a different type of one of the above types. The CORBA 102 and SOAP-XML 103 servers will distribute the application requests to the appropriate queues 105, which will in turn dequeue requests according to throttling parameters to the correct adaptor 106, as described hitherto.

Entrenched within the architecture of the system 10 resides the application activity detection art 107 which innovatively assesses and monitors the sanity and operation of the system 10 itself. Applications which make use of the Open Charging (OC) middleware platform and gateway system 10 are ordinarily expected to transmit a given number of requests during typical operation. Said system 107 monitors the number of transactions generated by the application per unit time period and reports a possible error condition if the expected number is derogated from.

In alternate embodiments, a complementary module 110 may be invoked whereby transactions to the IN platform 200 which update, among others, a subscriber's account information, and in particular, the subscriber's account balance, is written to a cache 110 within the system 10 itself rather than to the IN platform 200 thereby minimizing network impact thereof 200. Upon realization of preset activity thresholds, the updated subscriber information is then written to the IN Platform 200 by the module 110. The subscriber information caching or virtual account application (VAA) module 110, furthermore maintains synchronization with other events which can impact the subscriber balance by monitoring machine readable record which are generated by the IN platform 200 recording such activity.

Figure 2A:
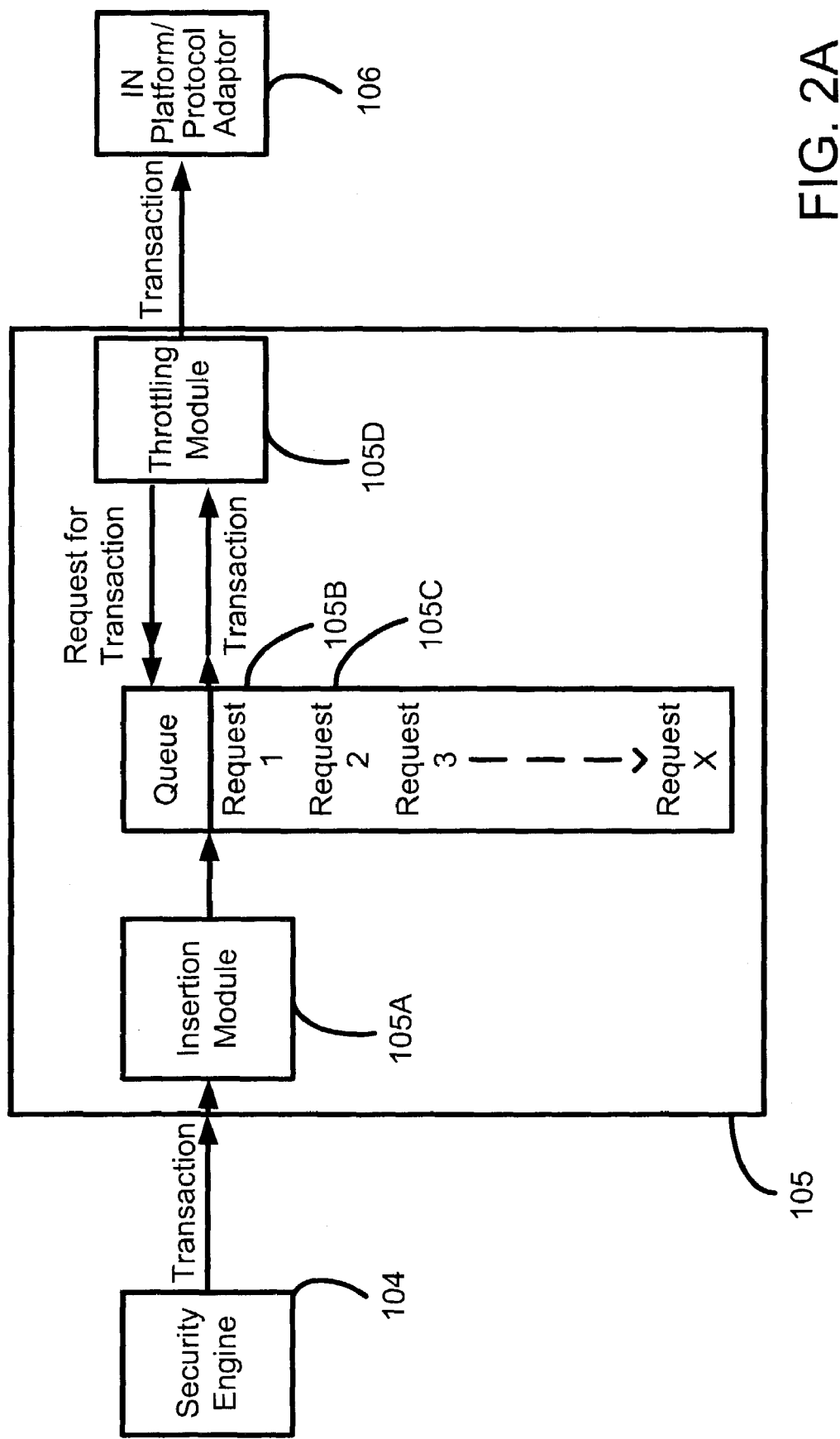
FIG. 2A and FIG. 2B represent illustrative diagrams of the advanced queuing methods embodied within the Open Charging (OC) middleware platform and gateway system.
Figure 2B:
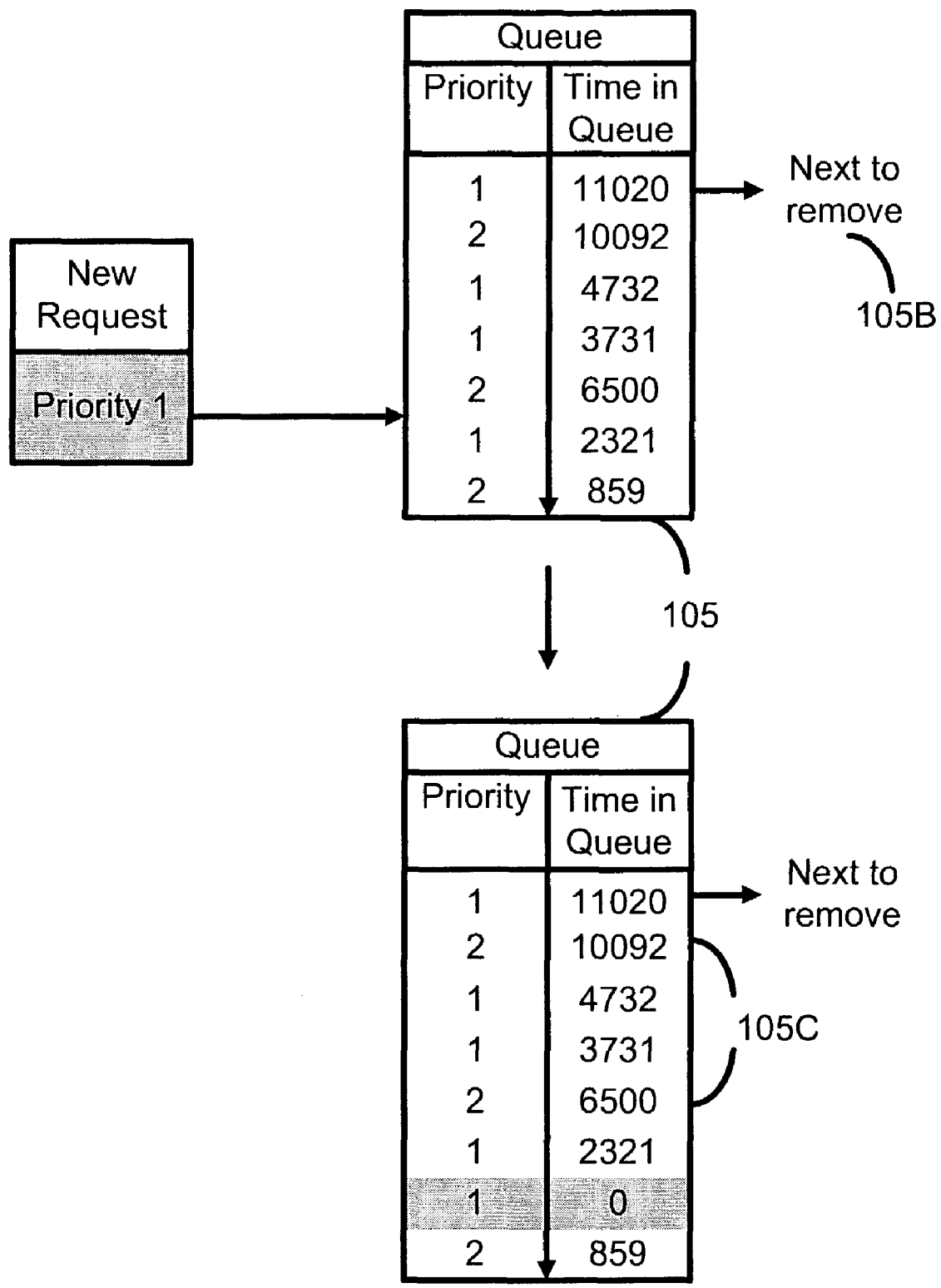

Now in reference to FIG. 2A and FIG. 2B, which both serve to further elucidate the innovative queuing process; the Queuing Module 105 supports advanced prioritized queuing which allows applications to be given priority over others. Priority is defined at the CORBA login level.

In reference specifically to FIG. 2A, at 105A said insertion position is based on transaction attributes (of which, non-limiting, illustrative examples include, priority of application that generated the transaction, type of transaction and length of time in the queue). At steps 105B and 105C, which are better delineated with reference now to FIG. 2B, an application with a higher priority 105B will have its transactions processed ahead of applications with lower priority during congestion periods. Applications with lower priority 105C will not be starved for resources as an individual transaction's priority increases the longer it stays in the queue. This will allow transactions by the lower priority application to be processed at a lower rate. Returning to FIG. 2A, at 105D, said request transactions are propagated at a fixed (throttled) rate.

Figure 3:
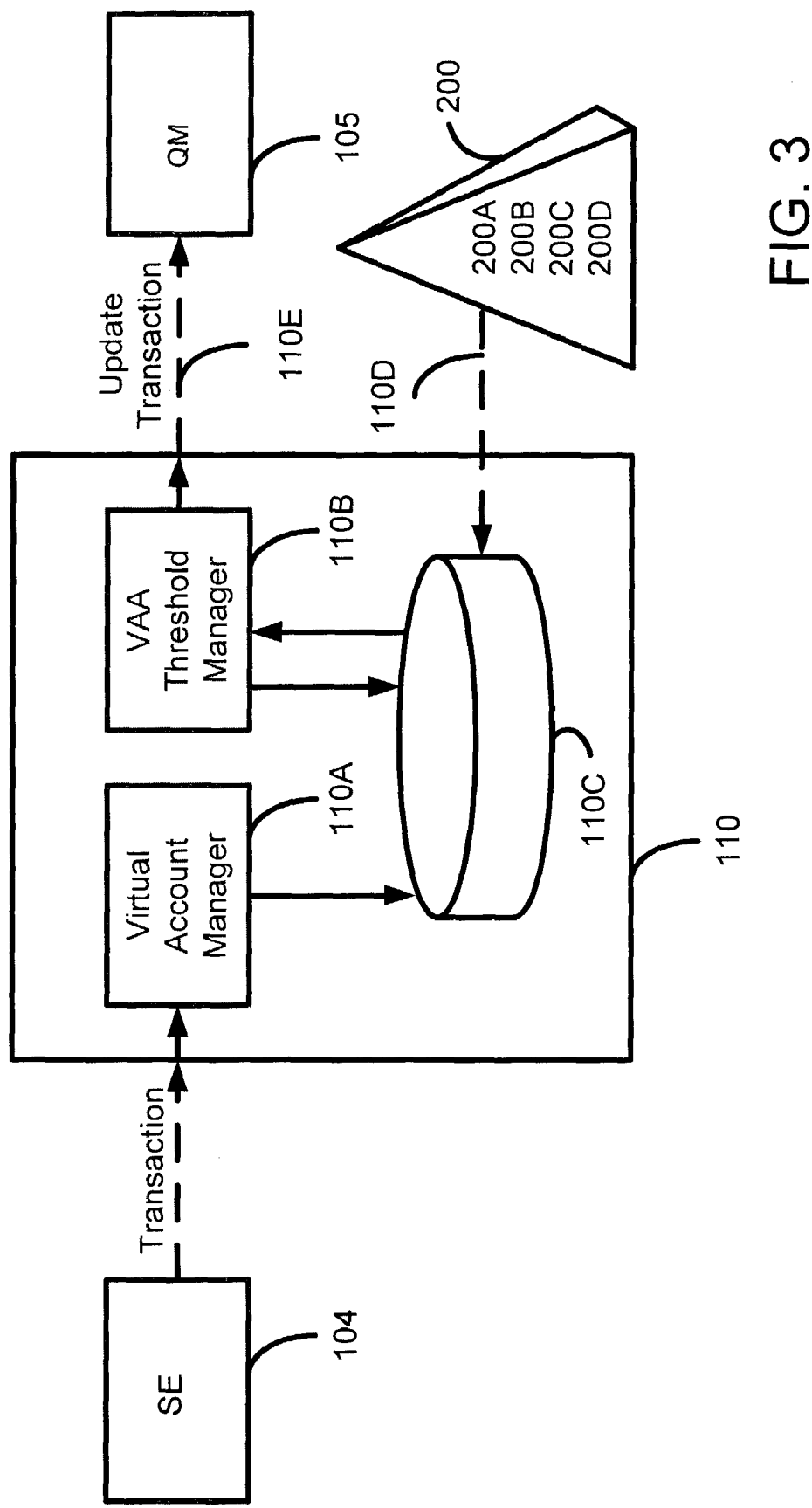
FIG. 3 details an expanded illustration of the Virtual Account Application (VAA) architecture.

With reference now to FIG. 3, which details an innovative, though elective, aspect of the Open Charging (OC) middleware platform and gateway system, the Virtual Account Application (VAA) 110 subscriber information caching mechanisms. The VAA 110 is situated architecturally amid the Security Engine 104 and the Queuing Module 105. Now, whenever a request is made, said Security Engine 104 will route the request to the VAA 110 (only where the application has been so configured as to invoke it of course), and processed according to the configuration parameters 110A.

In maintaining an accurate indication of subscriber balances, the VAA 110 processes, in real-time, machine readable records 110D generated by the IN Platform 200. Said records allow the VAA 110 to maintain an accurate cached balance 110C for each subscriber. In addition to the said cached balance 110C for each subscriber, the VAA 110 maintains an increment amount for each subscriber. This amount is the sum of all of the balance increments and balance deductions (as negatives) that the VAA 110 has cached for the user.

The VAA 110 then sends a single update 110E to the IN Platform (via the Queuing Module 105 and so forth, as aforementioned in relation to FIG. 1). Said update 110E representing all of the balance increments and balance deductions. The art of the VAA 110 thus reduces the number of transactions and network burden ultimately placed on the IN Platform 200, as it accommodates multiple updates of the cached virtual accounts 110C.

The update 110E to the IN Platform 200 is performed when said subscriber's balance, as calculated from the cached balance and the cached increment amount, passes a configurable threshold 110B. In alternate embodiments, the update 110E may be performed where a configurable amount of time 110B has passed since the previous update.

What is claimed is:

1. A gateway system comprising:
   a plurality of application interfaces for connecting to a respective plurality of external applications via at least one network; each said external application distinct from a plurality of subscribers accounts and configured to provide at least one external application function call relating to at least one of said plurality of subscribers accounts to its respective application interface;
   a plurality of intelligent network (IN) platform adapters for connecting to a respective plurality of IN platforms; each of said IN platforms configured to respond to at least one of said external application function calls; and
   a module interconnecting said application interfaces and said platform adapter interfaces;
   said module configured to maintain a routing indication associating each of said application interfaces with at least one of said IN platform adapters;
   said module further configured to route said at least one external application function call to one of said platform adapters based on said routing indication.

2. The gateway system of claim 1 wherein said IN platforms comprise at least one of prepaid, postpaid and/or hybrid systems.

3. The gateway system of claim 1 further comprising a provisioning interface connected to said module; said provisioning interface for receiving said routing indication and forwarding said routing indication to said module.

4. The gateway system of claim 3 wherein said routing indication is explicit, indicating unequivocally which platform a request for a particular function call for a given subscriber is to be routed to; or wherein said routing indication is implicit comprising criteria for determining which of said platforms to route a request to for a particular function call for a given subscriber.

5. The gateway system of claim 1 wherein said application function calls are standardly-defined.

6. The gateway system of claim 5, wherein said application function calls comprise at least one of a balance query, a balance deduction, and a balance increment for a particular subscriber according to parameters of the external application.

7. The gateway system of claim 1 further comprising a security engine connected to said module; said security engine configured to receive said external function call; said security engine further configured to verify whether or not said external application is in fact permitted to make such said external function call.

8. The gateway system of claim 7, wherein said security engine is configured to verify whether or not said external application is in fact permitted to make such said external function call based on one or more of: i) whether said external application is permitted to request said function; ii) whether said external application is permitted to access the Intelligent Network (IN) platform where a subscriber is hosted; iii) whether said external application is permitted to access and/or to modify the subscriber data as per MVNO (Mobile Virtual Network Operator) compliance requirements.

9. The gateway system of claim 7 whereupon if said security engine verifies that said external application is permitted to make such said external function call; then routing said external function call to one of said platform interfaces via said module based on said routing indication.

10. The gateway system of claim 9, wherein external function calls at said module are translated into a specific protocol respective to a IN platform interface designated by said routing indication.

11. The gateway system of claim 1, wherein said module is configured to employ standard queuing methodology and implementations as per the priority set by the external application which is making said external function call.

12. The gateway system of claim 1 further comprising a subscriber information caching mechanism for writing subscriber account information to a cache for subsequent forwarding to an IN platform interface designated by said routing indication.

13. The gateway system of claim 12, wherein said subscriber account information written to said cache represents a sum total of all balance increments and balance deductions associated with a plurality of said external function calls.

* * * * *